United States Patent [19]

Shaw

[11] 4,295,766
[45] Oct. 20, 1981

[54] SELF-ALIGNING DOME NUT

[76] Inventor: Francis Shaw, Old House Landing and Bianca Rd., East Hampton, N.Y. 11937

[21] Appl. No.: 6,667

[22] Filed: Jan. 25, 1979

Related U.S. Application Data

[63] Continuation-in-part of Ser. No. 928,542, Jul. 27, 1978, abandoned.

[51] Int. Cl.³ .................... F16B 37/14; F16B 39/00
[52] U.S. Cl. .................... 411/113; 411/177; 411/429; 411/542
[58] Field of Search ............... 151/41.73, 41.74, 41.76; 85/321 L, 53, 55, 15 P, 35

[56] References Cited

U.S. PATENT DOCUMENTS

| | | | |
|---|---|---|---|
| 1,370,474 | 3/1921 | Newsom | 85/35 X |
| 1,900,098 | 3/1933 | Cooper | 220/256 |
| 2,249,923 | 7/1941 | Whitcombe | 85/35 X |
| 2,304,107 | 12/1942 | Leisure | 85/35 X |
| 2,597,682 | 5/1952 | Snow | 85/15 P X |
| 2,672,500 | 3/1954 | Bondon | 174/153 |
| 2,688,497 | 9/1954 | Brisback | 151/41.73 X |
| 2,786,359 | 3/1957 | Karlan et al. | 85/35 X |
| 2,827,097 | 3/1958 | Nuss | 151/41.73 |
| 2,858,156 | 10/1958 | Wootton | 85/15 P X |
| 2,986,188 | 5/1961 | Karp et al. | 151/41.73 |
| 3,079,970 | 3/1963 | Barry | 151/41.73 |
| 3,164,191 | 1/1965 | Grimm et al. | 277/198 |
| 3,180,387 | 4/1965 | Dzus et al. | 151/41.73 |
| 3,431,811 | 3/1969 | Yonkers | 85/35 X |
| 3,646,982 | 3/1972 | Cushman | 151/41.7 |
| 3,695,324 | 10/1972 | Gulistan | 151/41.74 |
| 3,772,957 | 11/1973 | Newton | 151/14.5 X |
| 3,910,331 | 10/1975 | Randall | 151/41.73 X |
| 4,026,183 | 5/1977 | Bart | 411/542 |

FOREIGN PATENT DOCUMENTS

| | | | |
|---|---|---|---|
| 594260 | 3/1960 | Canada | 151/21 B |
| 1502520 | 10/1967 | France | 85/53 |
| 565661 | 11/1944 | United Kingdom | 151/41.7 |
| 790655 | 2/1958 | United Kingdom | 85/35 |
| 881680 | 11/1961 | United Kingdom | 85/15 P |

Primary Examiner—Thomas J. Holko
Attorney, Agent, or Firm—Pennie & Edmonds

[57] ABSTRACT

A self-aligning dome nut having a base member for connection into a hole or aperture of a mounting plate by a pressing operation. The base member has a neck portion on one side for connection into the hole and a cavity on its other side into which a nut member is loosely positioned. A protective dome encloses the cavity and covers the nut member. The dome is connected to the base member to leave an exposed portion on its other side for direct application of a clamping force during attachment of the dome nut to the support member. An insulting washer is disposed around the neck portion of the base member between it and the mounting plate, the insulating washer is sized to electrically isolate the nut from the support member and preclude electrical arcing therebetween.

17 Claims, 7 Drawing Figures

U.S. Patent  Oct. 20, 1981  Sheet 1 of 2  4,295,766
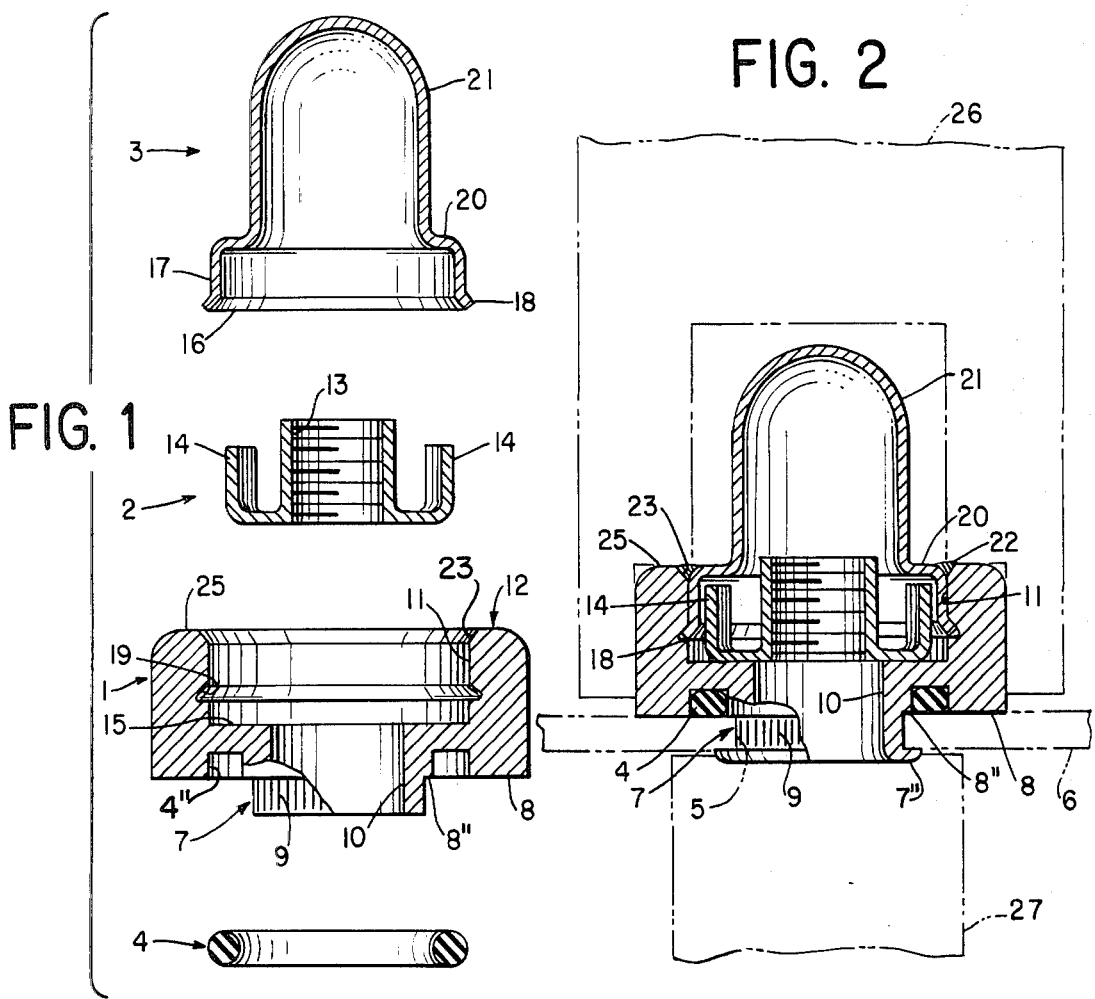
FIG. 1
FIG. 2
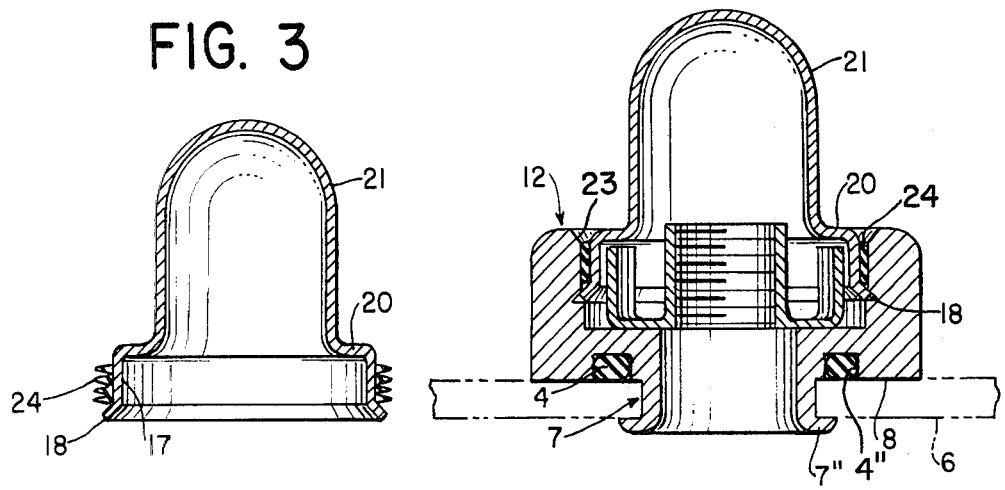
FIG. 3
FIG. 4

SELF-ALIGNING DOME NUT

RELATED APPLICATION

This is a continuation-in-part of copending application Ser. No. 928,542, filed July 27, 1978, and now abandoned.

BACKGROUND OF THE INVENTION

1. Field of the Invention

This invention relates generally to fasteners and, in particular, to a self-aligning dome nut.

2. Description of the Prior Art

Self-aligning nuts are useful where precise alignment of the cooperating male member is either difficult to obtain or too laborious. For example, with mass produced items where a number of repetitious connections are required to fasten two members together, production standards and efficiency can be improved with pre-assembly of the necessary nuts to one of the members. Where the nuts are fixed in position on the one member, mating of the other member and the cooperating male fasteners must be precise; and this results in a time-consuming assembly operation. To avoid this, nut constructions have been devised where the nut member actually floats in its connection to the one member. In this way, it can adjust itself to the proper position necessary for connection of the male member even when the male member is slightly out of alignment. The assembly operation is thus made easier and quicker.

One example of the prior art constructions includes a base member having a neck portion which is serrated on its outer periphery and adapted to be inserted into the hole of the mounting member. On the side of the base member opposite the neck portion, a threaded nut member is loosely attached whereby insertion of a threaded male member through the neck portion and into threaded engagement with the nut can be easily obtained without precise alignment of the nut. A nut of this construction is disclosed in U.S. Pat. No. 2,986,188.

In order to effect attachment of the above-described nut into the hole of the mounting member, a suitable attaching tool having a threaded end may be inserted through the neck portion of the base member and into threaded engagement with the floating nut. Tightening of the tool member by threading further into the nut will draw the neck into the hole of the mounting plate to effect attachment. Nut structures of this type are adequate where the clamping force required to effect attachment to the mounting member is not too severe so as to cause stripping of the threads during use of the attachment tool. Also, prior art structures of this type are suitable only where a fluid tight seal through the nut member is not required.

Other prior art constructions have been devised to provide for a fluid tight connection of the nut structure to the mounting member. One such structure is disclosed in the abovementioned patent and includes a base member having a neck portion on one side for insertion into the hole of the support member and a nut positioned on the other side of the base member. The nut is loosely or floatingly held in place by a protective cover which is crimped over the base member. To effect sealing, a suitable O-ring is positioned between the base member and the support member and another sealing member may be positioned between the base member and the protective cover. Constructions of this type can be connected to the support member with the threaded attaching tool described above, or alternatively, clamping forces can be applied to the protective cover pressing it against the support member to effect insertion of the neck into the hole of the support member and clinching thereof if desired.

As with the non-sealing type of nut, the use of a threaded attaching tool has limitations as to the force that may be applied in attaching the nut; and where clamping forces are applied to the protective cover, they can tend to disrupt the crimped connection of the cover to the base member and also distort the cover into the engagement with the floating nut. This, in turn, can eliminate the floating orientation of the nut and jam it so that it will not properly align with the threaded male member. This is particularly true where the forces required to effect a secure connection of the nut to the base member are relatively high.

Another prior art construction that provides for both self-alignment of the nut member and sealing of the structure to the support member incorportes a protective cover which is provided with two laterally extending flanges. Each of these flanges is provided with a hole through which rivets may be inserted for securing the cover and the enclosed floating nut to the support member. Structures of this type are disadvantageous in that that requires three holes in the support member, one for each of the rivets and a center hole for the insertion of the cooperating male member.

Nut constructions such as described above and to which the present invention relates, are used to facilitate attachment of the nutted support member to other structure. An example is in the aircraft industry where quick, accurate connection of the many sub-assemblies used in constructing the aircraft is desirable. Depending on the particular sub-assembly, it is sometimes necessary to electrically isolate the extending nuts from the surrounding structure. For example, with aircraft fuel tanks, the closure valve assembly through which fueling takes place is typically constructed as a sub-assembly and attached to the fuel tank wall be means of self-aligning nuts. These nuts protrude into the interior of the fuel tank and create a condition susceptible to causing electrical sparking or arcing. Electrical arcing may tend to occur as, for example, where the exterior of the fuel tank on the aircraft is struck by lightning and the electrical charge passed into the fuel tank by way of the attaching nuts. To preclude this electrical condition, it has been the past practice to coat each nut assembly with a sealing compound of non-conductive material. This operation, however, is a time-consuming and expensive hand operation. To be sure of proper electrical isolation, all edges of the nut must be carefully coated and the nut completely covered at its peripheral areas of contact with the interior wall surface of the tank.

SUMMARY OF THE PRESENT INVENTION

In accordance with the teachings of the present invention, a self-aligning, self-sealing dome nut is constructed whereby attachment to a support member can be effected through a single hole upon the direct application of a clamping force to the base portion of the nut structure without raising the possibility of damage or jamming of the floating nut member. More particularly, the dome nut of the present invention includes a base member having a neck portion on one side for attachment into the hole of a support member. The other side of the base member includes a cavity in which a floating nut is positioned. This cavity as well as the floating nut is covered by a protective dome member in such a way as to leave a peripheral portion of the base member exposed. This peripheral portion of the base member is adapted to receive a clamping force for pressing the base member against a support member so as to force the neck portion thereof into the hole of the support member. A cooperating tool may be applied to the other side of the support member where the neck portion extends through the hole; and clamping of the base member under high loads may be effected to clinch the exposed neck portion about the hole in the support member.

Since the application of the clamping force is applied directly to the support member, no damage to the protective dome or the floating nut contained therein will result. Further, during clamping of the base member to the support member, a fluid tight seal around the hole in the support member is provided by an O-ring seal member disposed between the base member and support member. In addition, leakage of fluid through the nut is prevented by sealing the protective cover to the base member.

In accordance with another aspect of the present invention, the dome nut is connected to the support member to provide a lightning-safe connection. This is accomplished by use of an oversized insulating washer. The washer is disposed about the neck portion of the base member of the nut and has an outer diameter larger than the diameter of the base member. With the base member, floating nut and protective dome disposed on the side of the support member which is to be lightning safe, the inclusion of the washer radially separates the nut from the underlying support member. The distance of separation is sufficiently large to prevent electrical arcing between the nut and support member as might otherwise occur from an electrical discharge passing through the base member from the other side of the support member.

BRIEF DESCRIPTION OF THE DRAWINGS

FIG. 1 is an exploded view in cross-section showing the component parts forming a dome nut of the present invention;

FIG. 2 is a cross-sectional view of the dome nut anchored to a support member;

FIG. 3 is a cross-sectional view of a modified construction of the protective dome of the dome nut of the present invention;

FIG. 4 is a cross-sectional view showing the assembled dome nut using the dome of FIG. 3;

DETAILED DESCRIPTION OF THE PREFERRED EMBODIMENT

Figure 5:
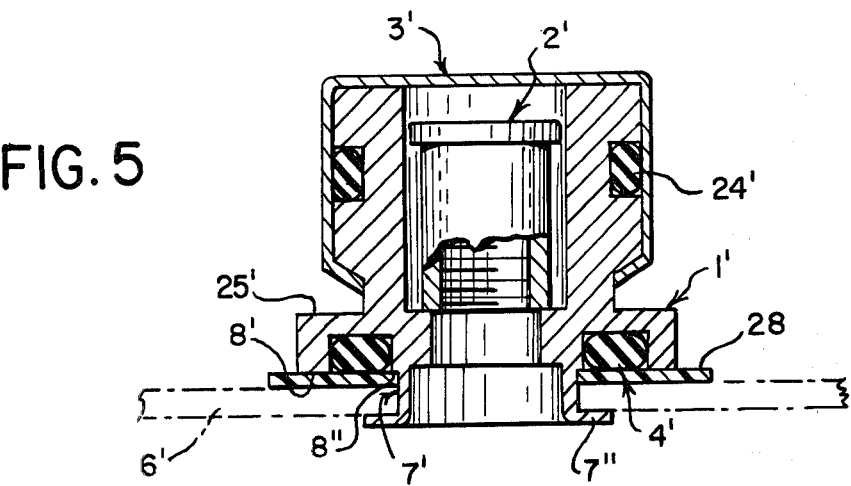
FIG. 5 is a cross-sectional view showing a modified embodiment of an assembled dome nut employing an insulated washer and having lightning-safe features.

As shown in FIG. 1, the dome nut of the present invention includes four basic parts, namely, a base member 1, a floating nut member 2, a protective covering dome 3 and an O-ring sealing member 4. The parts of the dome nut are shown in assembled condition in FIG. 2. FIG. 2 also shows the dome nut attached into a hole 5 of a support member 6.

In construction, the base member of the dome nut includes a neck portion 7 extending from one side 8 thereof. The neck portion includes serrations 9 on its peripheral surfaces; and upon insertion into the hole 5 of the support member 6, the serrations will cut into the wall surfaces of the hole and prevent rotation of the base member relative to the support member.

A hole 10 extends through the neck portion of the base member and communicates with a cavity 11 formed in the other side 12 of the base member. The cavity is dimensioned to receive the floating nut 2. As shown, the floating nut includes an internally threaded bore 13 and a pair of diametrically disposed wing members 14. The cavity is circular in shape at the end thereof adjacent the side 12 of the base member. The bottom portion 15 of the cavity may be milled to a rectangular shape for receiving the wing members 14 of the nut 2. This construction will prevent unlimited rotation of the nut within the cavity. Other suitable means may be provided for preventing such rotation.

The protective covering dome has an open end 16 defined by an enlarged skirt portion 17. The skirt portion terminates in a radially outwardly extending flange 18. The dome is adapted to be inserted into the cavity of the base member in relatively tight engagement with the circular wall surface and with the flange 18 snapping into a cooperating groove 19 formed in the wall surface.

When in assembled position, the dome covers the cavity and the nut disposed therein. With reference to FIG. 2, it is seen that the dome is constructed with a surface 20 connecting the skirt 17 with the upper dome portion 21. This surface is disposed in spaced relation above the wing members 14 of the nut to permit some vertical movement of the nut. As is also apparent from FIG. 2, the sizing of the nut 2 relative to the cavity is such as to permit some slight lateral adjustment of the nut within the cavity.

For providing a fluid tight connection of the dome nut to the support member 2, sealing means are provided. First, an O-ring groove 4" is formed in the bottom side 8 of the base member. This groove is spaced radially outwardly of the neck portion 7 to form a surface 8" on side 8. This surface will rest directly against the support member in the area immediately surrounding the hole 5 to provide for tight clamping. The O-ring sealing member 4 is positioned within the O-ring groove; and upon attachment of the dome nut to the support member, this O-ring seal will become compressed to form a fluid tight seal about the hole 5.

The second sealing means provided with the dome nut of the present invention seals the dome to the support member. This sealing can be effected by use of epoxy adhesive 22. For this purpose, the cavity 11 is chamfered at 23 where it meets with the side 12 of the base member. This forms a groove in which the epoxy is applied.

An alternative means for sealing the dome to the base member is shown in FIGS. 3 and 4. Here, a serrated flexible sealing member 24 is molded about the skirt portion 17 of the dome. Upon attachment of this dome to the base member as shown in FIG. 4, the serrations will flex and provide a fluid tight seal of the dome against the cavity wall of the base member.

With the construction as described above, it will be noted that the attachment of the dome to the base member leaves a peripheral portion 25 of the side 12 of the base member exposed. Thus, a clamping force may be applied directly against the portion 25 during attachment of the dome nut to the support member. For attaching the dome nut to the support member, a two-part clamping device shown in phantom lines at 26, 27 in FIG. 2 can be used. The clamping part 26 applies a clamping force directly against the peripheral portion 25 of the base member to force the serrated neck portion through the hole of the support member. Then, the part 27 of the clamping device may be applied against the exposed end 7' of the neck portion of clinch this exposed end about the hole in the support member.

With the construction of the dome nut as described above, the clamping force used to effect attachment of the dome nut may be relatively high to assure proper clinching; and due to the fact that the clamping forces are applied directly to a base member, no damage to the protective dome or floating nut contained therein will result. Where, for example, the base member is made of steel or stainless steel, the clinching pressure required to effect attachment to the support member will be about 4,000 lbs. for a #10 nut size and may range up to 9,000 lbs. for ½ inch nut sizes. It is therefore important that these high pressures not be applied directly against the protective covering dome which itself is thin walled and not constructed for withstanding any substantial pressure.

Figure 6:
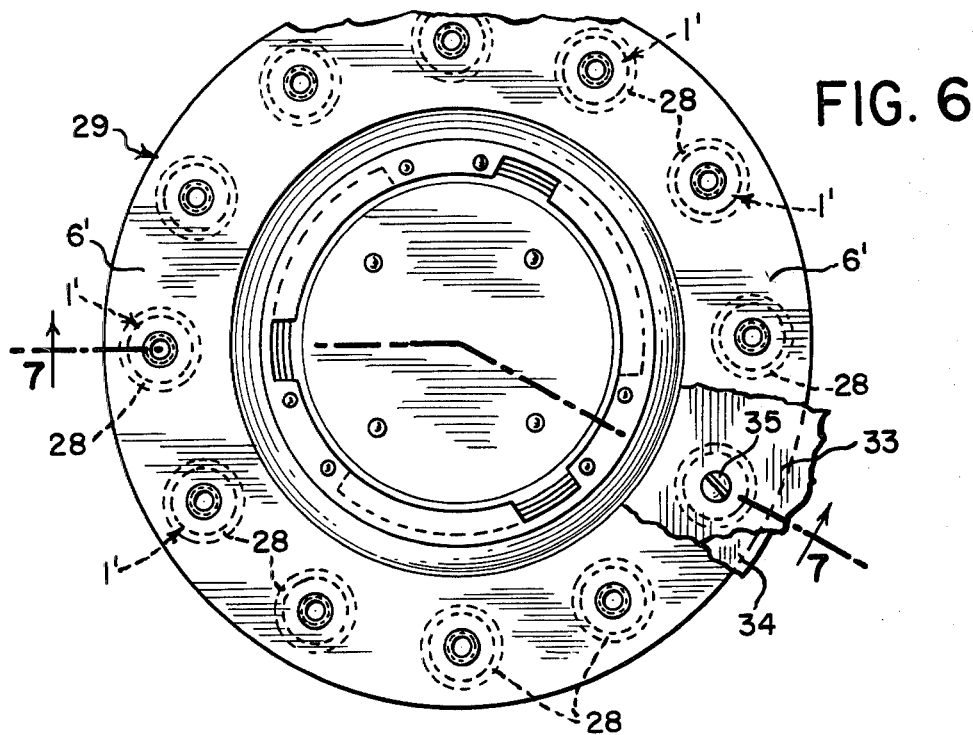
FIG. 6 is a top plan view of a closure valve assembly for an aircraft fuel tank to which the dome nuts shown in FIG. 5 are attached.
Figure 7:
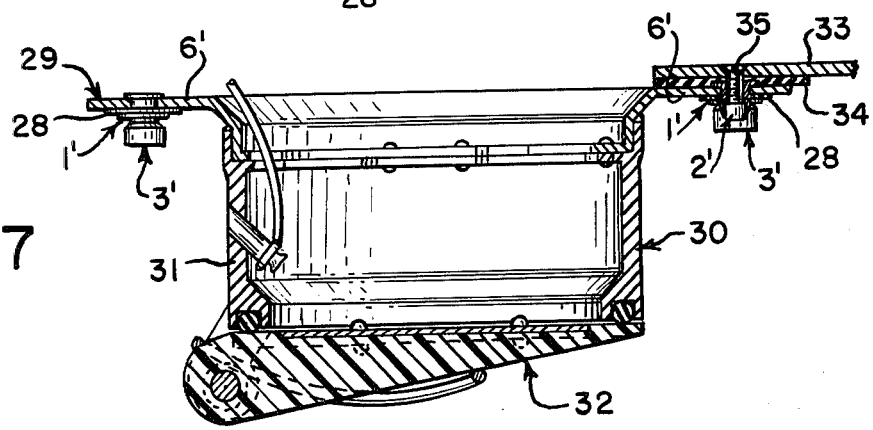
FIG. 7 is a cross-sectional view taken along lines 7—7 of FIG. 6 showing on one side the connection of the self-aligning nut to the closure valve assembly and on the other side the connection of the closure valve assembly to the fuel tank wall through use of the self-aligning nuts.

With reference to FIGS. 5, 6 and 7, the dome nut of the present invention is shown attached to a support member to provide a lightning-safe connection. In the embodiment of the dome nut shown in FIG. 5, the parts thereof similar in construction to the parts of the embodiment shown in FIGS. 1-4 are given the same reference numerals followed by the suffix prime ('). As seen from FIG. 5, the nut includes a base member 1', a floating nut 2', a protective dome 3', all of electrically conductive material, and an O-ring sealing member 4'. As with the embodiment of FIGS. 1-4, the floating nut 2' is held against rotation within the base member and a sealing member 24' is disposed between the skirt portion of the dome and the base member.

The base member 1' has a lower peripheral portion 25' and the dome 3' is connected to the base member radially inwardly of this outer peripheral portion. Thus, the necessary clamping force for attaching the nut to the support member can be applied directly against the peripheral portion 25'.

To effect the lightning-safe connection of the dome nut to the metal support member 6', an oversized electrically, non-conductive insulating washer 28 is provided. This washer is disposed about the neck portion 7' of the nut and provides a seating surface on which the side 8' of the base member sits. The washer may be made of suitable plastic material as, for example, Teflon. Its inner diameter underlies the surface 8" of the side 8' of the base member and its outer diameter extends radially beyond the base member. With a base member having an outer diameter of 15.2 mm, the outer diameter of the washer will be 18.3 mm. The inner diameter of the washer is such as to provide a clearance of 0.254 mm with respect to the diameter of the neck portion of the base member which is 8.1 mm in diameter. The washer in the embodiment shown in FIG. 5 is 0.127 mm thick.

With the above construction, the washer extends radially beyond the base member by a distance sufficient to prevent arcing between the nut and the support member 6'. The inclusion of the insulating washer thus electrically isolates the nut from the interior surrounding wall of the fuel tank. Without the inclusion of the washer, the potential for arcing exists around the entire periphery of the base member 1' where it contacts the support member 6'. This potential for arcing exists apparently because the contact between the base member and the underlying member cannot be perfect in the sense of electrically uniting the two members together as one.

In FIGS. 6 and 7, the support member 6' is represented as being the flange of an adaptor plate 29 of a closure valve assembly for an aircraft fuel tank. The assembly includes the adaptor and a flapper valve 30 attached to the adaptor. The flapper valve in turn includes a housing 31 and a flapper valve plate 32 pivotally attached to the housing at its lower end. The flapper valve plate pivots to an open position upon insertion of a fuel hose nozzle for permitting filling of the tank. A fuel tank cap is adapted to be inserted and locked into the open adaptor at the other end of the housing 31.

At the left side of FIGS. 6 and 7, the dome nut of FIG. 5 is shown attached to the flange 6' of the adaptor plate 29. On the right side of these figures the adaptor plate is shown as attached to the fuel tank wall 33 of the aircraft's fuel tank. A suitable gasket 34 is provided between the adaptor and wall 33 to prevent leakage of fuel; and screws 35 are used to attach the adaptor to the fuel tank wall by their threaded connections with the floating nuts 2'.

With the above construction, a lightning strike against the exterior of the fuel tank in the area adjacent the fuel tank opening may cause an electrical discharge to pass through one or more of the dome nuts and into the interior of the fuel tank. The inclusion of the insulating washer effectively isolates these nuts from the interior of the fuel tank and thus prevents any arcing or sparking between the nuts and the interior wall surface of the fuel tank.

I claim:

1. A self-aligning dome nut comprising:
   (a) a base member having:
     (1) a neck portion extending from one side thereof for attachment into an aperture of a support member with at least part of the one side of said base member resting directly on the support member,
     (2) a hole extending through said neck portion in the direction of the extension thereof, and
     (3) a cavity in the other side of the base member in communication with the hole in the neck portion;
   (b) a nut member loosely positioned within said cavity and in adjustable alignment with the hole in said neck portion, said nut being held against extended rotation within the cavity; and
   (c) a protective covering dome enclosing said cavity and covering the nut member, said dome having an open end connected to the base member radially inwardly of its outer periphery to leave generally the entire other side of the base member available for direct application of a clamping force during attachment of the dome nut to the support member, the available portion being in alignment with the part of the one side of the base member resting directly on the support member.

2. A self-aligning dome nut according to claim 1 wherein:

(a) the neck portion of the base member includes external serrations for forced tight engagement within the aperture of the support member.

3. A self-aligning dome nut according to claim 2 wherein:
(a) the dome includes a surface extending in spaced relation over the nut member to limit vertical movement thereof within the cavity of the base member.

4. A self-aligning dome nut according to claim 3 further comprising:
(a) an O-ring groove in the one side of the base member in surrounding relation with the neck thereof; and
(b) an O-ring disposed within said groove for sealing against the support member when the one side of the base member rests directly thereon.

5. A self-aligning dome nut according to claim 4 wherein:
(a) said O-ring groove is spaced radially outwardly of the neck portion of the base member; and
(b) the portions of the one side of the base member which rests directly on the support member are disposed both radially inwardly and radially outwardly of said O-ring groove.

6. A self-aligning dome nut according to any of claims 1-5 wherein:
(a) the dome is connected at its open end to the interior wall surface of the cavity in the base member.

7. A self-aligning dome nut according to claim 6 further comprising:
(a) sealing means disposed between the dome and interior wall surface of the cavity for preventing leakage of fluid therebetween.

8. A self-aligning dome nut according to claim 7 wherein:
(a) the sealing means comprises an epoxy adhesive.

9. A self-aligning dome nut according to claim 7 wherein:
(a) the sealing means comprises an annular sealing ring molded to the outer periphery of the dome where it faces the interior wall surface of the cavity.

10. A self-aligning dome nut according to claim 7 further comprising:
(a) a groove in the interior wall surface of the cavity extending therearound at a location spaced from the other side of the base member; and
(b) a radially outwardly extending flange on the dome at the open end thereof for snap fitting into said groove of the cavity wall.

11. A lightning-safe connection between a self-aligning dome nut and a support member comprising:
(a) an electrically conductive support member having an aperture therethrough;
(b) a dome nut including:
(1) an electrically conductive base member having:
(i) a neck portion extending from one side thereof and secured in the aperture of the support member with the one side of said base member facing the support member,
(ii) a hole extending through said neck portion in the direction of extension thereof, and
(iii) a cavity in the other side of the base member in communication with the hole in the neck portion,
(2) a nut member loosely positioned within said cavity and in adjustable alignment with the hole in said neck portion, said nut being held against extended rotation within the cavity, and
(3) a protective covering dome enclosing said cavity and covering the nut member, said dome having an open end connected to the base member; and
(c) a non-conductive insulating washer disposed around said neck portion and between the one side of the base member and the underlying side of the support member, said washer being dimensioned to electrically isolate the base member from the radially surrounding area of the underlying support member by a distance sufficient to prevent electrical arcing therebetween from an electrical discharge passing through the base member from the other side of said support member.

12. A lightning-safe connection according to claim 11 wherein:
(a) the insulating washer has an external diameter larger than the diameter of the base member along its one side to radially space the base member from the underlying side of the support member by a distance sufficient to prevent said electrical arcing.

13. A lightning-safe connection according to claim 12 further comprising:
(a) an O-ring groove in the one side of the base member of the dome nut in surrounding relation with the neck portion thereof; and
(b) an O-ring seal disposed within said groove for sealing the base member to the washer against fluid flow therebetween.

14. A lightning-safe connection according to claim 13 wherein:
(a) the O-ring groove is spaced radially outwardly of the neck portion of the base member; and
(b) the insulating washer underlies the portions of the one side of the base member disposed both radially inwardly and radially outwardly of said O-ring groove.

15. A lightning-safe connection according to claim 14 wherein:
(a) the protective covering dome is connected to the base member radially inwardly of the outer periphery of the base member.

16. A lightning-safe connection according to claim 15 wherein:
(a) the dome is connected at its open end to the interior wall surface of the cavity in the base member.

17. A lightning-safe connection according to any one of claims 11-16 wherein:
(a) the electrically conductive support member defines, in part, the wall of a tank; and
(b) the underlying side of the support member, between which and the one side of the base member the washer is disposed, is the inner wall of the tank.

* * * * *